United States Patent

Bruner et al.

[11] Patent Number: 6,141,564
[45] Date of Patent: Oct. 31, 2000

[54] METHOD OF SHARING A SIM CARD BETWEEN TWO MASTERS

[75] Inventors: John David Bruner, Barrington; Eric Edward Payne, Urbana; Richard Allen Pace, Champaign; Nathaniel David Roberts, Urbana, all of Ill.

[73] Assignee: Motorola, Inc., Schaumburg, Ill.

[21] Appl. No.: 09/409,359

[22] Filed: Sep. 30, 1999

[51] Int. Cl.[7] ................................................ H04B 1/38
[52] U.S. Cl. ........................... 455/558; 455/552; 379/357
[58] Field of Search .............................. 458/435, 552, 458/558, 575, 557, 556, 550; 379/357

[56] References Cited

U.S. PATENT DOCUMENTS

| | | | |
|---|---|---|---|
| 5,521,966 | 5/1996 | Friedes et al. | 379/357 |
| 5,799,068 | 8/1998 | Kikinis et al. | 379/357 |
| 5,987,317 | 11/1999 | Venturini | 455/552 |
| 5,987,325 | 11/1999 | Tayloe | 455/435 |

*Primary Examiner*—Reinhard J. Eisenzopf
*Assistant Examiner*—Greta J. Fuller
*Attorney, Agent, or Firm*—Lalita P. Williams

[57] ABSTRACT

Method and apparatus for sharing a SIM card between two masters. The invention may be embodied in so-called multi-mode radiotelephones that use SIM cards to store and access information. The multi-mode radiotelephone includes at least two master components and a single SIM card. The method and apparatus synchronizes and coordinates communications from either master component directly to the SIM card, thereby allowing a single SIM card to directly service two master components.

6 Claims, 3 Drawing Sheets

METHOD OF SHARING A SIM CARD BETWEEN TWO MASTERS

BACKGROUND OF THE INVENTION

A. Field of the Invention

The present invention relates in general to so-called multi-mode radiotelephones that use SIM cards to store and access information. More particularly, the invention relates to a multi-mode radiotelephone having at least two master components and a single SIM card. A method and apparatus are provided for synchronizing and coordinating communications from either master component directly to the SIM card, thereby allowing a single SIM card to directly service two master components. The present invention has particular application to portable radiotelephones used to communicate with terrestrial cellular or satellite wireless telephony systems.

B. Description of Relevant Art

A Subscriber Identity Module (SIM) card is, in general, a smart card that is used in connection with cellular radiotelephones that follow the GSM cellular communications standard. Because they are smart cards, SIM cards are basically small computers that have their own processors. SIM cards generally contain a variety of information related to the subscriber, including, for example, a subscriber identifier, a phonebook identifying a stored bank of telephone numbers, voice messages, encryption sequences for secured data communications over the air, and other information. The SIM card can be removed from the phone and used by the subscriber on another phone, thereby allowing users the flexibility of being able to essentially take their "identity" with them from phone to phone.

A multi-mode radiotelephone that uses technology similar to the above-described SIM card is Motorola's Satellite Series 9500 Portable Telephone designed for use on the Iridium System (hereinafter "multi-mode phone"). The multi-mode characteristics of such a phone allow communication through either a satellite telephony network or a terrestrial cellular telephony network. It follows generally the GSM communication standard and therefore also uses a SIM card. For flexibility, the multi-mode phone is preferably modular, and its primary modular component is its base phone unit, which provides the main communication conduit between the user and the satellite-based telephony system. Various cellular cassette modules may be plugged into the base phone unit, with each cellular cassette module providing a communication conduit to a particular cellular system. For example plug-in cassettes are available that follow one of several cellular air interface standards developed/promulgated by the Telecommunications Industry Association, while another different plug-in cassette is available that follows the European GSM cellular standards. The base phone unit is essentially a complete radiotelephone including microprocessor, display, microphone, speakers and keypad. Each cellular cassette is also a substantially complete radiotelephone having the essentially the same components as the base phone unit minus the display and key-pad.

Thus, a multi-mode phone that uses a single SIM card, and that has plugged therein a cellular cassette based on the GSM standard, must allow information on the SIM card to be accessed by both the base phone unit and the cellular cassette. However, conventional SIM cards are designed to interact with and be accessed by only one device at a time. Because a SIM card has its own processor, and because the GSM standard generally requires a relatively elaborate scheme for communicating with a SIM card, interacting with and accessing data from the SIM card is more complicated than just reading data out from a RAM. Instead, the requesting device and the SIM card are actually exchanging commands and responses back and forth. However, the SIM card's processor is relatively simple and slow and does not have a clear concept of state. Therefore it is not designed to switch back and forth between commands received from different master devices. For example, assume that one master device instructs the SIM card to first enter a particular directory, enter an associated subdirectory, open a file in that subdirectory, and output a record in that subdirectory. If in the middle of executing these instructions, a second master device also needs to access data on the SIM card and therefore sends to the SIM card an instruction to go to a different directory, the SIM card would execute that instruction when received without reconciling it with the instructions that it received from the first master device.

Thus, SIM cards have, to date, been associated with and used by one master device, which is typically the phone in which the SIM card is housed. Other devices external to the phone may interact with and access information on a given SIM card, but such external devices typically access the SIM card indirectly by going through the phone in which the SIM card is housed. Accordingly, there is a need for a method and apparatus that allows two master devices to directly interact with and access information on a conventional SIM card.

SUMMARY OF THE INVENTION

The present invention provides a method and apparatus that allows two master devices to directly interact with and access information on a conventional SIM card. The invention may be embodied in an apparatus comprising: a first master component; a second master component; a smart card; a smart card manager program that receives requests from said first master component and said second master component directed to said smart card; said requests comprising a sequence of operations; said smart card manager program also receiving responses from said smart card directed to either said first master component or said second master component; said smart card regulating when said requests are initiated such that requests received during execution of a previously received request is held until said previously received request is completed.

The smart card may comprise a SIM card. Additionally, said apparatus may comprise a multi-mode radiotelephone; said first master component may comprise a satellite radiotelephone module; and said second master component may comprise a cellular radiotelephone module.

The invention itself, together with further objects and attendant advantages, will best be understood by reference to the following detailed description, taken in conjunction with the accompanying drawings.

DESCRIPTION OF THE PREFERRED EMBODIMENT

By way of example only, the method and apparatus of the present invention are disclosed in connection with a portable radiotelephone that includes at least two relatively intelligent peer components that each interact with a single SIM card. It should be understood, however, that any system requiring the transfer of data files or any other information from either of two master components to a smart card may employ the techniques shown herein.

Figure 1:
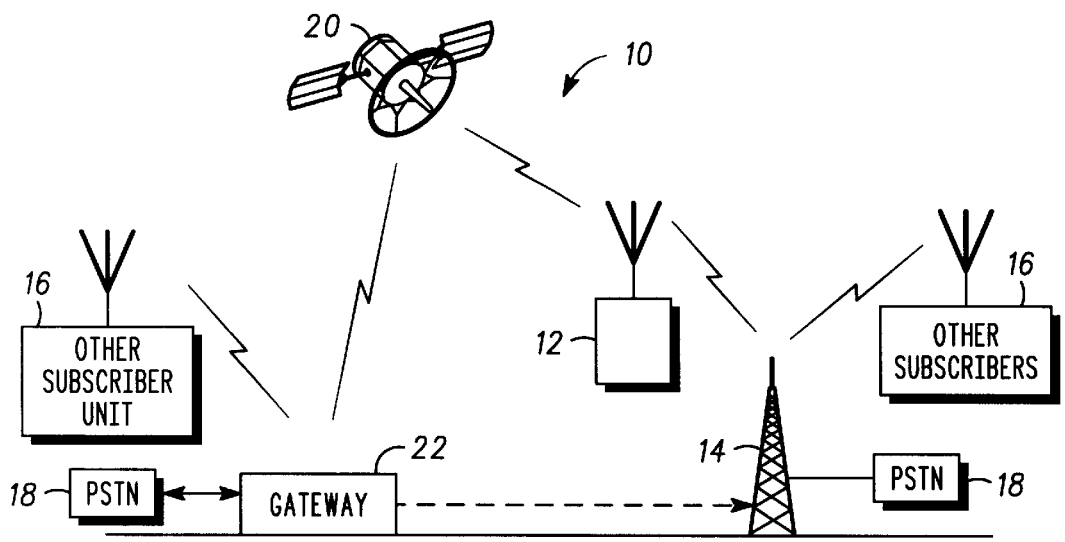
FIG. 1 is a block diagram a communication system and a multi-mode radiotelephone embodying the present invention.
Figure 2:
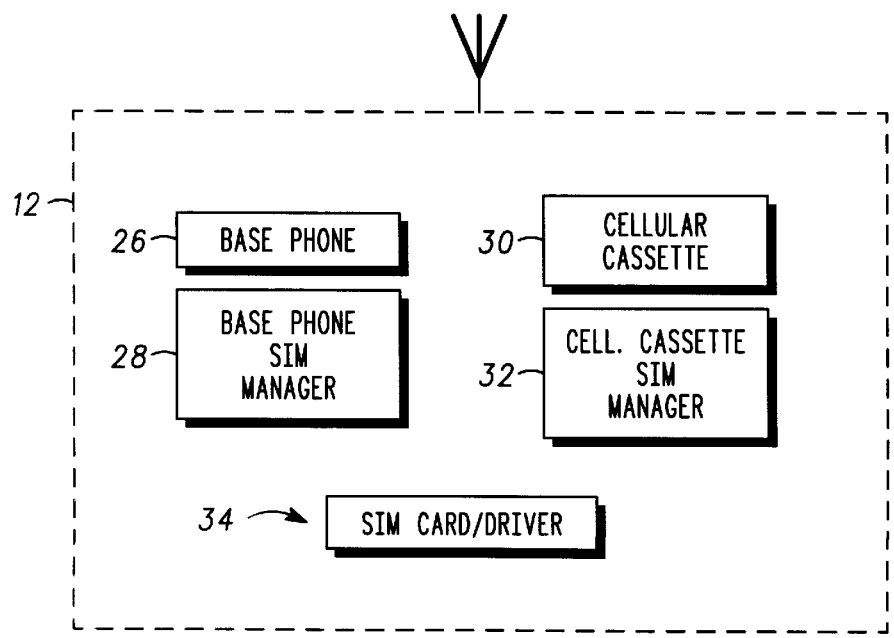
FIG. 2 is another block diagram showing more detail about the multi-mode radiotelephone shown in FIG. 1.

FIGS. 1 and 2 are block diagrams of a telephony communication system 10 and associated multi-mode radiotelephone 12 embodying the present invention. An example of a radiotelephone 12 of the type shown in FIGS. 1 and 2 is Motorola's Satellite Series 9500 Portable Telephone designed for use on the Iridium System (hereinafter "multi-mode phone"). The primary modular component of the radiotelephone 12 is its base phone unit 26, which provides the main communication conduit between the user and the satellite-based section of the telephony system 10. Various cellular cassette modules 30 may be plugged into the base phone unit, with each cellular cassette module providing a communication conduit to a particular cellular system. For example a particular plug-in cassette is available that follows one of several cellular air interface standards developed/promulgated by the Telecommunications Industry Association, while another different plug-in cassette is available that follows the European GSM cellular standards. A conventional SIM card 34 is plugged into the base phone unit 26 and, using the present invention as described later herein, may communicate directly with and be accessed directly by either the base phone unit 26 (via its SIM manager 28) or the cellular cassette 30 (via its SIM manager 32).

The base phone unit 26 is essentially a complete radiotelephone including microprocessor, display, microphone, speakers and keypad. Each cellular cassette 30 is also a substantially complete radiotelephone having essentially the same components as the base phone 26 minus the display and key-pad. The communication system 10 includes both satellite and cellular components. Although single components are depicted, for example, one satellite 20, one radiotelephone 12, one base station 14, etc., it should be understood that the an implemented communication system may includes several such components.

The multi-mode modular radiotelephone 12 communicates with the terrestrial cellular system via the base station 14. The base station 14 provides access to other subscribers 16 and the public switched telephone network (PSTN) 18. The radiotelephone 12 communicates with the satellite telephony system via a satellite 20 and a gateway 22. The gateway 22 provides a communication link to the PSTN 18, the base station 14 and other subscribers/units 16.

Thus, the multi-mode radiotelephone 12 has the capability of, in a known manner, operating in either a satellite mode or terrestrial cellular mode. Cellular operation is provided by the modular cellular cassette units 30 that a user can insert into the base phone unit 26. If the cellular cassette 30 operates according to the GSM standard, a SIM card 34 is required for its operation. Assuming that the base phone unit 26 also uses a SIM card, and further assuming that the SIM card is a conventional type that was not designed for use in a multi-master environment, the present invention provides a method and apparatus by which the same SIM card 34 may be used by both the base phone unit 26 and the GSM cellular cassette 30, thereby allowing the same SIM card 34 to be used on both networks (cellular and satellite), and further allowing the multi-mode phone 12 to automatically switch between networks.

The following is a general description of the methodology of the present invention. The term "primitive" is used to denote a messaging units and associated tasks that flow from one functional entity (e.g., the base phone unit 26) to another (e.g., the cellular cassette 30, or some other peripheral (not shown) connected to the multi-mode phone 12 through its accessory interface (also not shown)). The aforementioned primitive tasks may be either tasks within the same multi-mode phone or across the multi-mode phone's accessory bus interface.

In operation, the GSM cellular cassette unit 30 needs to access the SIM card 34 for subscriber information used by its signaling stack. The base phone unit 26 also desires to concurrently access data on the same SIM card 34. The SIM card 34 is physically located on the base phone unit 26, thereby providing base phone access. For access to the SIM card 34 by the cellular cassette 30, known multi-mode phones, such as the aforementioned Motorola Series 9500 phone, provide an intelligent peripheral interface to a remote SIM card reader, normally located on the accessory bus. This interface is what is typically used to access the SIM card reader on the base phone unit 26 from the GSM cellular cassette 30. According to one aspect of the present invention, the base phone unit 26 provides to the cellular cassette 30 with a virtual peripheral that looks exactly like the external SIM card reader that the cellular cassette expects to see. This virtual peripheral serves as a "front end" for the task 32 in the GSM cellular cassette 30 that manages its access to the SIM card 34.

Known GSM intelligent peripheral interfaces for remote SIM card readers do not incorporate any synchronization. Accordingly, as implemented for known GSM multi-mode phones, the remote card reader is accessed by only one master (the GSM phone's SIM manager task). The cellular cassette 30 is therefore not the sole "master" of a remote SIM card reader. Instead, it is a client of the base-phone-unit-defined SIM manager task.

The SIM manager task on known GSM cellular cassettes 30 corresponds to the SIM functionality of the SIM manager task on the base phone unit 26. For example, in the Motorola Series 9500 multi-mode phone, it is largely unchanged from its counterpart in a fully-functional GSM-based multi-mode phone. The principal exceptions are that it (i.e., the SIM task manager) does not attempt to perform card-holder validation (CHV), regardless of whether the SIM indicates that CHV is enabled; it does not assume that it knows the current directory; and it flags the end of a sequence of SIM instructions with a special primitive. In all other respects, SIM task manager on the GSM cellular cassette behaves exactly as if it were communicating with an intelligent SIM card reader.

Known intelligent peripheral interfaces to the SIM card reader are defined at a low level, i.e., individual instructions to the SIM. A single high-level operation consists of multiple low-level instructions, and there are no markers to distinguish when one sequence ends and another begins. This makes it difficult to interleave sequences of SIM instructions from the cellular cassette 30 with accesses to the SIM card 34 by the base phone unit 26.

A second, related, problem is that the physical SIM card maintains its own notion of a current directory. The GSM SIM manager task is not aware of accesses to the SIM card from the base phone unit 26. Therefore, it cannot track the current directory. This has two implications: first, the GSM cellular cassette 30 must always perform a SELECT at the start of an instruction sequence, and second, the GSM base phone unit 26 cannot verify the current directory every 30 seconds while a call is active, as required by GSM 1 1.1 1. Further, the SIM manager task on the GSM cellular cassette 30 (and the SIM manager task on the base phone unit 26) implements a cache for some data elements on the SIM that must be accessed quickly by the signaling code. The cache is written back to the SIM card upon request from the signaling software. The separate caches in the GSM cellular cassette 30 and in the base phone unit 26 introduce a coherence problem, namely, that changes in one cache must somehow be reflected in the other.

The present invention provides a solution to the above-described problems by extending the intelligent peripheral primitive set for the SIM card reader to include an additional primitive:

SIM_INSTRUCTION_END_REQ. The SIM manager task 32 on the cellular cassette 30 sends a sequence of SIM_INSTRUCTION_REQ primitives to the SIM card 34 to implement a high level operation (e.g., reading an information element). It sends the SIM_INSTRUCTION_END_REQ primitive after the last instruction to mark the end of the sequence.

According to the present invention, the base phone unit 26 via its SIM manager 28 implements a virtual peripheral that supports SIM card reader primitives. The SIM_INSTRUCTION_REQ and SIM_INSTRUCTION_END_REQ primitives are sent to the to the SIM manager task 28 on the base phone unit 26 for processing. When the SIM card 34 is in the ready state, the SIM manager task 28 looks for high-level primitives (e.g., information element requests from other tasks in the base phone unit 26) and for low-level primitives. if it finds a low-level primitive (e.g., SIM_INSTRUCTION_REQ), it considers the SIM card 34 to be in the "busy" state and forwards the primitive to the active card reader (internal via the SIM task or directly to the external SIM card reader on the accessory bus). The card reader will respond with SIM_INSTRUCTION_CNF, which the SIM manager task will send back to the cellular cassette 30.

A Once the SIM manager task 28 has processed a low-level SIM_INSTRUCTION_REQ primitive, it will not accept any further high-level requests from the base phone unit 26. Instead, it looks only for additional low-level primitives, of which there are only two: additional SIM_INSTRUCTION_REQ primitives and the end marker, SIM_INSTRUCTION_END_REQ. When SIM_INSTRUCTION_END_REQ is received, the task will consider the SIM card 34 to be in the "ready" state again. The SIM_INSTRUCTION_END_REQ primitive will not be passed to the card reader.

The SIM manager "snoops" the SIM_INSTRUCTION_REQ primitives it receives to track changes to the current directory (SELECT instructions). The base phone unit 26 "SEEM" is required (by GSM 1 1.1 1) to verity that the directory does not change unexpectedly when a cellular-mode call is in progress (i.e., that the user does not swap out the SIM card).

The SIM managers 28, 32 on the base phone unit 26 and the cellular cassette 30 maintain a cache of time-critical data. This mostly consists of signaling-related information. If the signaling stack is inactive when the cellular cassette 26 is being used, most of the cached data is only actively updated by one entity at a time. The caches are flushed back to the SIM card, and refreshed from the SIM card, when the multi-mode phone switches between cellular and satellite modes (and vice versa).

All control functions involving SIM activation and cardholder validation are performed only on the base phone unit 26. The GSM cellular cassette 30 will only be notified of the presence of a SIM card 34 when that SIM is active and the PIN is unlocked. If the SIM is active but the PIN is locked, the base phone unit 26 will present the appearance that no SIM is present. The GSM cellular cassette 30 will never actually be allowed to activate a SIM card that has not already been activated on the base phone unit 26 (and had its PIN unlocked).

Figure 3:
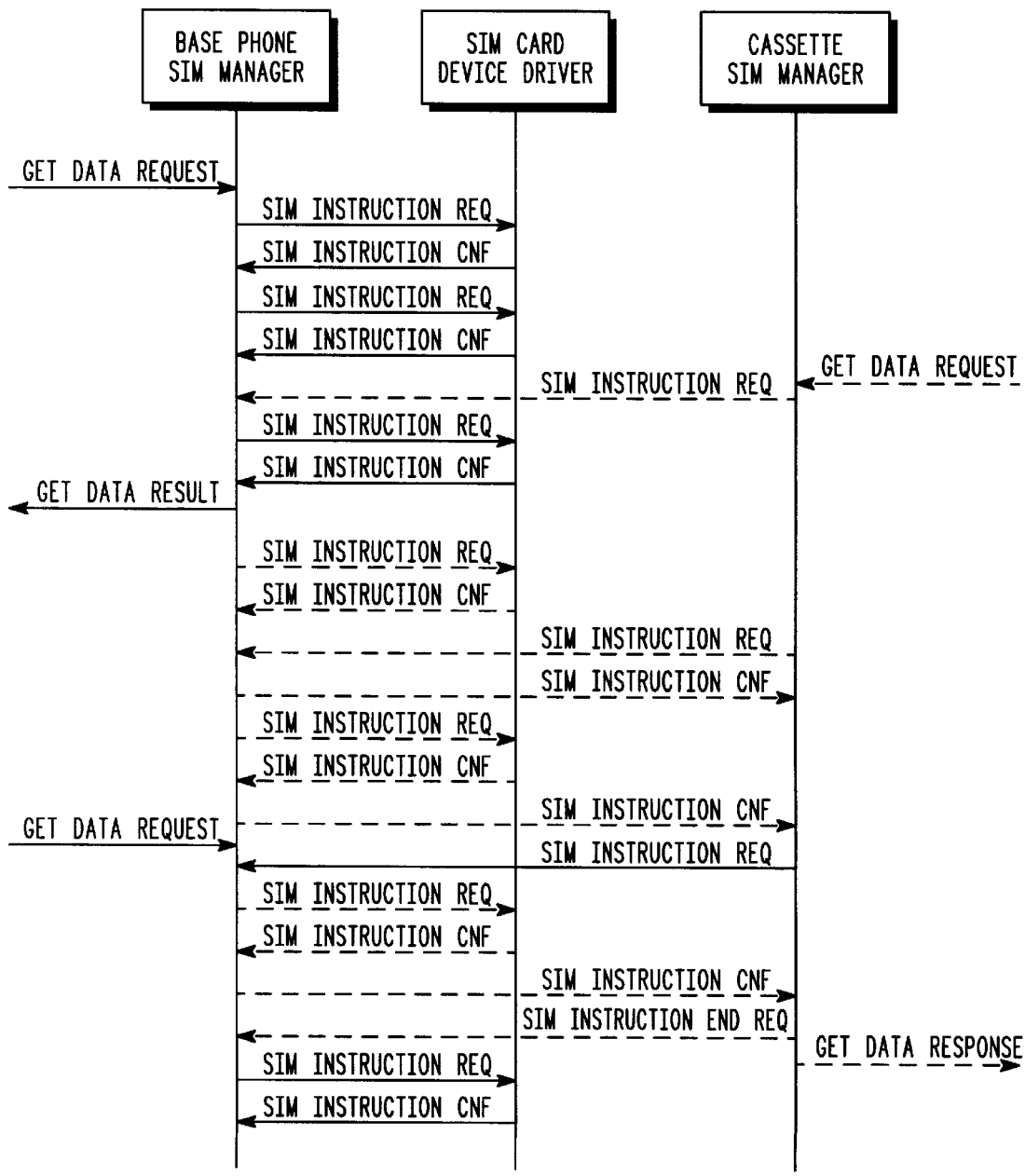
FIG. 3 is a message sequence chart that illustrates the method of the present invention.
Figure 4:
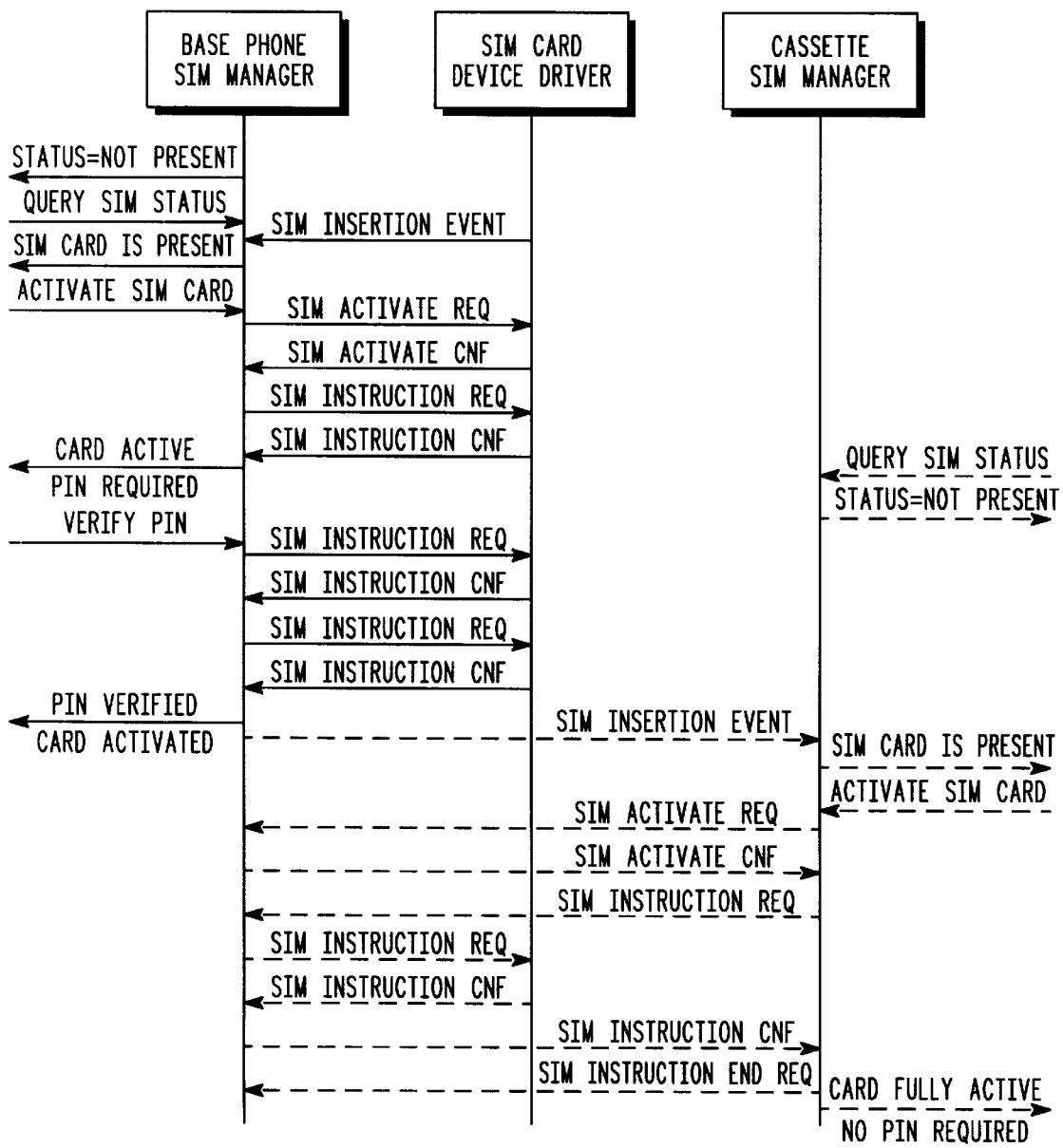
FIG. 4 is another message sequence further illustrating the method of the present invention.

The message sequence charts of FIGS. 3 and 4 illustrate the above-described protocols embodying the present invention. Three functional entities are represented in the charts: the base phone's SIM manager, which responds to high-level requests from other portions of the phone, the cassette's SIM manager, which has the same function within the cassette, and the SIM card device driver, which receives low-level instructions from the SIM manager and actually operates the SIM card. All operations upon the SIM card from the cassette go through the base phone's SIM manager. It is responsible for interleaving its own instruction sequences with those received from the cassette's SIM manager.

Operations on the SIM card typically consist of a series of instructions (SIM instruction requests, or SIM_INSTRUCTION_REQ) which return "confirmation" messages containing data from the SIM (SIM_INSTRUCTION_CNF). Typically, a high-level data request is comprised of several low-level instructions.

Referring specifically to FIGS. 3 and 4, the solid line arrows represent operations performed on behalf of the base phone, and the broken line arrows represent operations performed on behalf of the cassette. FIG. 3 illustrates how concurrent data requests from both the base phone and the cassette are handled. Upon receipt of a request for data, the base phone SIM manager starts sending instructions to the SIM card. In the midst of this sequence, the cassette's SIM manager also receives a data request, and it sends its first instruction to the base phone SIM manager. The base phone SIM manager holds this request because it is in the midst of its own series of SIM instructions. When its sequence of SIM instructions is complete, it sends its own result data out then forwards the cassette's SIM instruction to the SIM card device driver.

Some time later, a new request arrives to the base phone SIM manager from the base phone. It holds this request because it is in the midst of a cassette sequence. It continues to route data back and forth between the cassette's SIM manager and the SIM card device driver until the sequence is complete (indicated by the SIM_INSTRUCTION_END_REQ). At this point, it begins to issue the SIM instructions for the new base phone request.

FIG. 4 illustrates how a SIM card activation is handled. Initially, there is no card in the SIM card reader, and when the base phone sends a query to the SIM manager, the SIM manager responds that no card is present. A SIM card is inserted, resulting in a SIM insertion event being sent to the base phone's SIM manager (but not to the cassette's SIM manager). The SIM manager notifies the rest of the base phone that the card is present, and it receives a request to activate the SIM card. It sends an activation request to the SIM driver (SIM_ACTIVATE_REQ), receives a confirmation (SIM_ACTIVATE_CNF), and then sends a series of instructions to activate the card, finally sending back an indication that the card is active but that a PIN (CHV) value is needed to unlock it. The base phone responds with the PIN, and the SIM manager exchanges the appropriate instructions with the SIM device driver to verify the PIN value. When this sequence is complete, it notifies the base phone that the PIN is verified. At this point, it also notifies the cassette's SIM manager that a SIM card has been inserted. Up until this point, the cassette's SIM manager does not believe a card is present. However, once it has been notified of the SIM card, it too sends an activate request. Because the SIM card is already activated, the base phone's SIM manager does not pass this on to the SIM card. Instead, it internally responds with an activation confirmation. Thus, the activation is handled internally by the base phone's SIM manager. The cassette's SIM manager believes it has activated the card, and as no PIN is needed a second time, it reports to the rest of the cassette that the card is fully active.

Of course, it should be understood that a range of changes and modifications can be made to the preferred embodiment described above. It is therefore intended that the foregoing detailed description be regarded as illustrative rather than limiting and that it be understood that it is the following claims, including all equivalents, which are intended to define the scope of this invention.

What is claimed is:

1. An apparatus comprising:

a first master component;

a second master component;

a smart card;

a smart card manager program that receives requests from said first master component and said second master component directed to said smart card;

said requests comprising a sequence of operations;

said smart card manager program also receiving responses from said smart card directed to either said first master component or said second master component;

said smart card regulating when said requests are initiated such that requests received during execution of a previously received request is held until said previously received request is completed.

2. The apparatus of claim 1 wherein said smart card comprises a SIM card.

3. The apparatus of claim 2 wherein:

said apparatus comprises a multi-mode radiotelephone;

said first master component comprises a satellite radiotelephone module; and said second master component comprises a cellular radiotelephone module.

4. A method comprising the steps of:

receiving requests from first master component and from a second master component directed to a smart card;

said requests comprising a sequence of operations;

receiving responses from said smart card directed to either said first master component or said second master component;

regulating when said requests are initiated such that requests received during execution of a previously received request is held until said previously received request is completed.

5. The method of claim 4 wherein said smart card comprises a SIM card.

6. The method of claim 5 wherein:

said first master component comprises a satellite radiotelephone module; and said second master component comprises a cellular radiotelephone module.

* * * * *